(12) United States Patent
Cho et al.

(10) Patent No.: US 11,858,501 B2
(45) Date of Patent: Jan. 2, 2024

(54) VEHICLE AND METHOD OF CONTROLLING THE SAME

(71) Applicants: Hyundai Motor Company, Seoul (KR); Kia Corporation, Seoul (KR)

(72) Inventors: Jin Kyeom Cho, Suwon-si (KR); Yeon Bok Kim, Seongnam-si (KR); Hui Un Son, Suwon-si (KR); Tae Wook Park, Incheon (KR); Seong Wook Moon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 217 days.

(21) Appl. No.: 17/501,593

(22) Filed: Oct. 14, 2021

(65) Prior Publication Data

US 2022/0111838 A1    Apr. 14, 2022

(30) Foreign Application Priority Data

Oct. 14, 2020    (KR) .......................... 10-2020-0132399

(51) Int. Cl.
*B60W 30/09*    (2012.01)
*B60W 20/20*    (2016.01)
(Continued)

(52) U.S. Cl.
CPC ............ *B60W 30/09* (2013.01); *B60W 20/20* (2013.01); *B60K 6/46* (2013.01); *B60T 7/12* (2013.01);
(Continued)

(58) Field of Classification Search
CPC .. B60W 30/09; B60W 20/20; B60W 2520/06; B60W 2530/20;
(Continued)

(56) References Cited

U.S. PATENT DOCUMENTS 6,084,508 A * 7/2000 Mai ........................... B60T 7/22
340/436
9,764,719 B2 * 9/2017 Wilhelm ............. B60T 8/17558
(Continued)

FOREIGN PATENT DOCUMENTS

BR    102020009621 A2 *    6/2021    ............. B60K 26/02
CN    107161147 A *    9/2017
(Continued)

*Primary Examiner* — Atul Trivedi
(74) *Attorney, Agent, or Firm* — Slater Matsil, LLP

(57) ABSTRACT

An emergency braking function control method of a vehicle includes detecting an obstacle ahead of the vehicle, the vehicle being in a state of being travelable in a forward direction using power of a power source, in response to the detecting, determining a first steering angle and a second steering angle, the first steering angle being a maximum steering angle at which the vehicle collides with the obstacle and the second steering angle being a steering angle at which the vehicle turns while maintaining a minimum safe distance from the obstacle, the first and second steering angles being determined based on a distance to the obstacle, a heading of the obstacle, and an input steering angle, and determining whether to change an emergency braking function based on the input steering angle, the first steering angle, or the second steering angle.

19 Claims, 7 Drawing Sheets

(51) Int. Cl.
*B60T 7/12* (2006.01)
*B60K 6/46* (2007.10)

(52) U.S. Cl.
CPC ..... *B60W 2520/06* (2013.01); *B60W 2530/20* (2013.01); *B60W 2530/201* (2020.02); *B60W 2554/4041* (2020.02); *B60W 2554/802* (2020.02); *B60W 2710/18* (2013.01); *B60Y 2200/92* (2013.01)

(58) Field of Classification Search
CPC ... B60W 2530/201; B60W 2554/4041; B60W 2554/802; B60W 2710/18; B60Y 2200/92; B60K 6/46; B60T 7/12
USPC .......................................................... 701/22
See application file for complete search history.

(56) References Cited

U.S. PATENT DOCUMENTS

| | | | |
|---|---|---|---|
| 10,569,770 B1* | 2/2020 | You | B60W 30/09 |
| 10,773,732 B1* | 9/2020 | Alexander | G05D 1/0212 |
| 10,821,946 B2 | 11/2020 | Kim et al. | |
| 10,836,377 B2* | 11/2020 | Lee | B60G 21/0555 |
| 2007/0299610 A1* | 12/2007 | Ewerhart | B60T 7/22 |
| | | | 701/301 |
| 2009/0210114 A1* | 8/2009 | Baumann | B60T 7/12 |
| | | | 701/45 |
| 2016/0016560 A1* | 1/2016 | Parker | B60T 7/22 |
| | | | 701/70 |
| 2017/0080952 A1* | 3/2017 | Gupta | G08G 1/163 |
| 2018/0201260 A1* | 7/2018 | Ichikawa | G01S 17/46 |
| 2018/0281857 A1* | 10/2018 | Choi | B60W 10/20 |
| 2019/0092323 A1* | 3/2019 | Viehmann | B60W 30/18172 |
| 2019/0168721 A1* | 6/2019 | Breuer | B60T 7/22 |
| 2019/0276013 A1* | 9/2019 | Kim | B60W 10/20 |
| 2019/0322273 A1* | 10/2019 | Wu | B60W 30/09 |
| 2020/0055515 A1* | 2/2020 | Herman | G06V 20/56 |
| 2020/0062246 A1* | 2/2020 | Park | B60W 30/09 |
| 2020/0307584 A1* | 10/2020 | Yashiro | B60W 10/11 |
| 2022/0105963 A1* | 4/2022 | Costa | G06V 20/58 |
| 2022/0289198 A1* | 9/2022 | Schmitt | B60W 50/10 |
| 2023/0097675 A1* | 3/2023 | Yasui | B60W 50/14 |
| | | | 701/301 |
| 2023/0311864 A1* | 10/2023 | Iwase | B60W 40/09 |
| | | | 701/301 |
| 2023/0322214 A1* | 10/2023 | Katayama | B60W 30/09 |
| | | | 701/301 |

FOREIGN PATENT DOCUMENTS

| | | | | |
|---|---|---|---|---|
| DE | 102020125982 A1 * | 4/2021 | | B60W 30/08 |
| EP | 3037308 A1 * | 6/2016 | | B60T 7/22 |
| KR | 20160065539 A | 6/2016 | | |
| KR | 101777329 B1 * | 9/2017 | | B60W 20/14 |
| KR | 20180078986 A | 7/2018 | | |

* cited by examiner

VEHICLE AND METHOD OF CONTROLLING THE SAME

CROSS-REFERENCE TO RELATED APPLICATIONS

This application claims the benefit of Korean Patent Application No. 10-2020-0132399, filed on Oct. 14, 2020, which application is hereby incorporated herein by reference.

TECHNICAL FIELD

The present invention relates to a vehicle and a method of controlling the same.

BACKGROUND

Recently, in addition to the power performance of a vehicle, safety has become an important evaluation factor when purchasing vehicles. Passive safety systems for protecting a driver and a passenger in the event of a collision have been primarily developed to date. These days, however, active safety systems for minimizing or preventing the occurrence of a collision using information acquired by various sensors are being actively developed.

As an example of active safety systems, there is an emergency braking system that performs an emergency braking function using an ultrasonic sensor or a radar sensor mounted on the front/rear side of a vehicle. The emergency braking function is a function that restricts the output torque of a vehicle or performs a braking operation when an object is present within a predetermined distance from the front/rear side of the vehicle and a driver does not manipulate an accelerator pedal or a brake pedal.

However, sudden torque restriction for prevention of a collision may deteriorate drivability, thereby increasing the risk of an accident. Further, a simple warning about the risk of a collision makes it difficult for a driver to effectively respond to the collision risk. This situation will now be described with reference to FIG. 1.

FIG. 1 is a diagram for explaining a problem pertaining to an emergency braking function.

Referring to FIG. 1, when a host vehicle 10 detects a forward object 20, such as a preceding vehicle that is stopped, while traveling in a first lane, the driver of the host vehicle 10 may attempt to change lanes to a second lane at a comparatively short distance from the forward object 20 (e.g. a distance at which an emergency braking function needs to be executed). If the driver of the host vehicle 10 determines that the lane change to the second lane is possible, the driver steers the host vehicle 10 at an angle large enough to avoid a collision with the forward object 20 and enters the second lane before a following vehicle 30 traveling in the second lane comes close to the host vehicle 10. At this time, however, if an emergency braking function is activated, the host vehicle 10 faces the risk of a collision with the following vehicle 30. This collision problem that occurs when changing lanes during travel may also occur in the case in which the driver of the host vehicle 10 starts to move the vehicle in the state in which the vehicle is parked in line with other parked vehicles on a shoulder.

SUMMARY

The present invention relates to a vehicle and a method of controlling the same. Particular embodiments relate to a vehicle and a method of controlling the same capable of controlling whether to activate an emergency braking function in response to a driver's steering manipulation when an obstacle is present ahead of a host vehicle.

Accordingly, embodiments of the present invention are directed to a vehicle and a method of controlling the same that substantially obviate one or more problems due to limitations and disadvantages of the related art.

An embodiment of the present invention provides a vehicle and a method of controlling the same capable of preventing undesired activation of an emergency braking function in response to a driver's steering manipulation when an obstacle is present ahead of a host vehicle.

However, the embodiments of the present invention are not limited to the above-mentioned embodiments, and other embodiments not mentioned herein will be clearly understood by those skilled in the art from the following description.

An emergency braking function control method of a vehicle according to an embodiment of the present invention may include determining, when the vehicle detects an obstacle ahead in the state of being travelable in a forward direction using power of a power source, a first steering angle, which is the maximum steering angle at which the vehicle collides with the obstacle, and a second steering angle, which is a steering angle at which the vehicle turns while maintaining the minimum safe distance from the obstacle, based on the distance to the obstacle, the heading of the obstacle, and an input steering angle, and changing whether to activate an emergency braking function or an activation reference distance at which the emergency braking function is activated based on at least one of the input steering angle, the first steering angle, or the second steering angle.

In addition, a vehicle according to an embodiment of the present invention may include an obstacle detection device, a power source, and an emergency braking function control device configured to determine, when the vehicle detects an obstacle ahead using the obstacle detection device in the state of being travelable in a forward direction using power of the power source, a first steering angle, which is the maximum steering angle at which the vehicle collides with the obstacle, and a second steering angle, which is a steering angle at which the vehicle turns while maintaining the minimum safe distance from the obstacle, based on the distance to the obstacle, the heading of the obstacle, and an input steering angle, and to change whether to activate an emergency braking function or an activation reference distance at which the emergency braking function is activated based on at least one of the input steering angle, the first steering angle, or the second steering angle.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
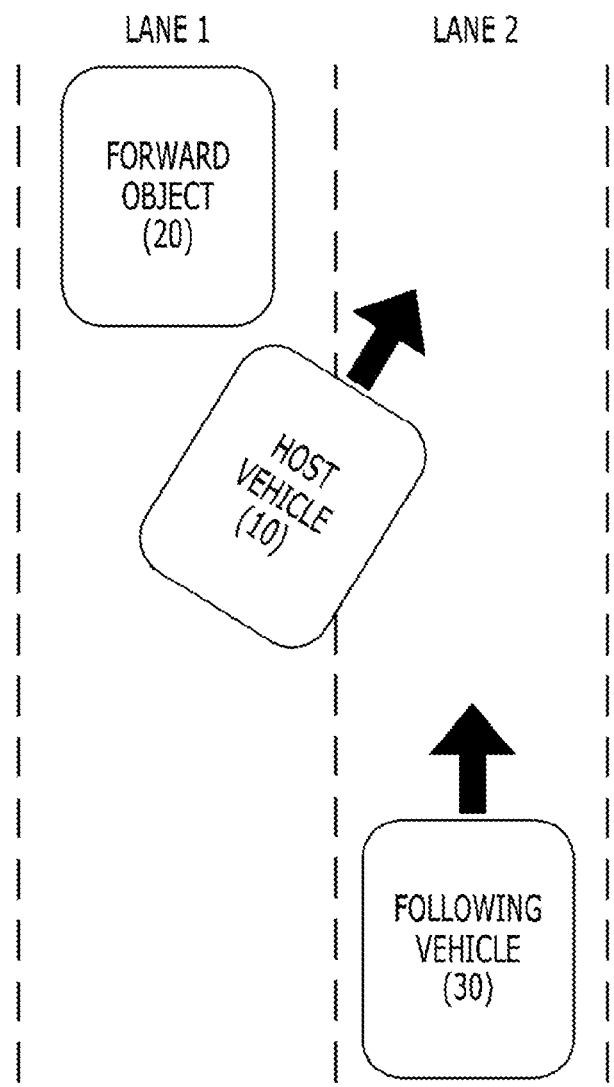
FIG. 1 is a diagram for explaining a problem pertaining to an emergency braking function.

Hereinafter, embodiments of the present invention will be described in detail with reference to the accompanying drawings so that those skilled in the art may easily carry out the embodiments. The present invention may, however, be embodied in many different forms, and should not be construed as being limited to the embodiments set forth herein. In the drawings, parts irrelevant to the description of embodiments of the present invention will be omitted for clarity. Like reference numerals refer to like elements throughout the specification.

Throughout the specification, when a certain part "includes" or "comprises" a certain component, this indicates that other components are not excluded, and may be further included unless otherwise noted. The same reference numerals used throughout the specification refer to the same constituent elements.

Before explaining a vehicle and a method of controlling the same according to embodiments of the present invention, the structure and control system of a hybrid electric vehicle will be first described as an example of vehicles to which embodiments are applicable. Of course, except for parts peculiar to a hybrid electric vehicle, the embodiments can also apply to general vehicles equipped with internal combustion engines, as well as motorized vehicles such as electric vehicles (EVs) or fuel cell electric vehicles (FCEVs), other than hybrid electric vehicles.

Figure 2:
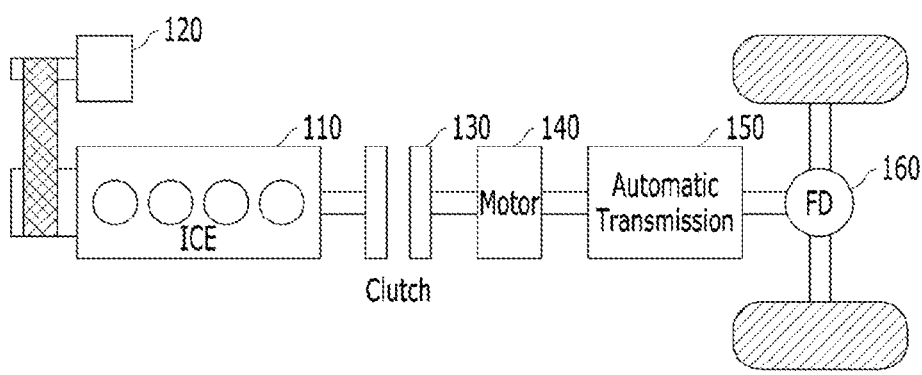
FIG. 2 is a diagram showing an example of the structure of a powertrain of a parallel-type hybrid electric vehicle to which embodiments of the present invention are applicable.

FIG. 2 is a diagram showing an example of the structure of a powertrain of a parallel-type hybrid electric vehicle to which embodiments of the present invention are applicable.

Referring to FIG. 2, the powertrain of the hybrid electric vehicle employs a parallel-type hybrid system in which a drive motor 140 and an engine clutch (EC) 130 are disposed between an internal combustion engine (ICE) 110 and a transmission 150.

In such a vehicle, when a driver steps on an accelerator pedal after starting the vehicle, the motor 140 is first driven using the power of a battery in the state in which the engine clutch 130 is open, and then the power of the motor 140 is transmitted to the wheels via the transmission 150 and a final drive (FD) 160 in order to rotate the wheels (i.e. EV mode). When greater power is needed as the vehicle is gradually accelerated, a starter/generator motor 120 operates to drive the engine 110.

When the rotational speeds of the engine 110 and the motor 140 become equal, the engine clutch 130 becomes locked, with the result that both the engine 110 and the motor 140, or only the engine 110, drives the vehicle (i.e. transitioning from an EV mode to an HEV mode). When a predetermined engine OFF condition is satisfied, for example, when the vehicle decelerates, the engine clutch 130 becomes open, and the engine 110 is stopped (i.e. transitioning from the HEV mode to the EV mode). In addition, when the hybrid electric vehicle brakes, the power of the wheels is converted into electrical energy, and the battery is charged with the electrical energy, which is referred to as recovery of braking energy or regenerative braking.

The starter/generator motor 120 serves as a starter motor when the engine is started, and operates as a generator when the rotational energy of the engine is collected after the engine is started or when the engine is turned off. Therefore, the starter/generator motor 120 may be referred to as a "hybrid starter generator (HSG)", or may also be referred to as an "auxiliary motor" in some cases.

The driving mode of the hybrid electric vehicle will be described below in detail based on the above-described structure.

The EV mode is mainly used in a situation in which a vehicle speed is low and required torque is low, and in the EV mode, the engine clutch 130 is opened and torque is transferred to the wheels using only the motor 140 as a power source.

The HEV mode is mainly used in a situation in which a vehicle speed is high and required torque is high, utilizes the engine 110 and the motor 140 as a power source, and may be subdivided into an HEV series mode and an HEV parallel mode. In the HEV series mode, the engine clutch 130 is opened (i.e. connection between the engine 110 and the drive shaft is interrupted), the power of the engine 110 is used to generate electrical energy by the HSG 120, and only the motor 140 directly generates power. On the other hand, in the HEV parallel mode, the engine clutch 130 is locked, with the result that both the power of the engine 110 and the power of the motor 140 are transferred to the wheels.

Figure 3:
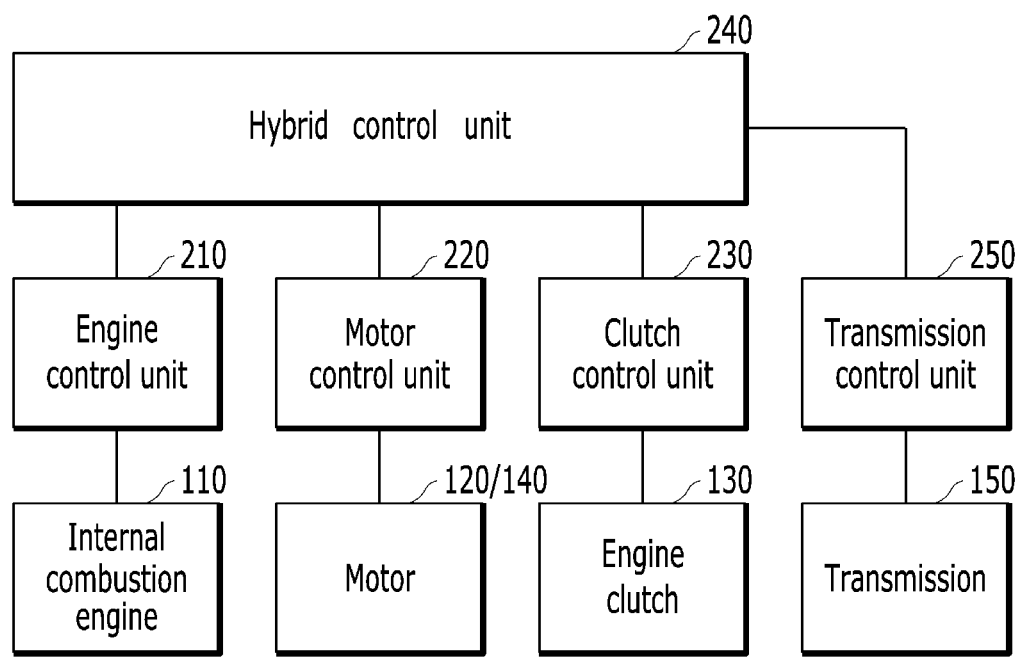
FIG. 3 is a block diagram showing an example of the control system of a hybrid electric vehicle to which embodiments of the present invention are applicable.

FIG. 3 is a block diagram showing an example of the control system of the hybrid electric vehicle to which embodiments of the present invention are applicable.

Referring to FIG. 3, in the hybrid electric vehicle to which embodiments of the present invention are applicable, the internal combustion engine 110 may be controlled by an engine control unit 210. The torque of the starter/generator motor 120 and the drive motor 140 may be controlled by a motor control unit (MCU) 220. The engine clutch 130 may be controlled by a clutch control unit 230. Here, the engine control unit 210 is also referred to as an engine management system (EMS). In addition, the transmission 150 is controlled by a transmission control unit 250.

Each of the control units may be connected to a hybrid control unit (HCU) 240, which is an upper-level control unit that controls the overall process of mode switching, and may provide information necessary for engine clutch control at the time of switching the driving mode or shifting gears and/or information necessary for engine stop control to the hybrid control unit 240, or may perform an operation in response to a control signal under the control of the hybrid control unit 240.

For example, the hybrid control unit 240 determines whether to perform mode switching between the EV mode and the HEV mode depending on the travel state of the vehicle. To this end, the hybrid control unit determines an open time of the engine clutch 130 and controls hydraulic pressure (in the case of a wet engine clutch) or controls torque capacity (in the case of a dry engine clutch) when the engine clutch is opened. In addition, the hybrid control unit 240 may determine the state of the engine clutch 130 (lock-up, slip, open, etc.), and may control the time at which to stop injecting fuel into the engine 110. In addition, the hybrid control unit may transmit a torque command for controlling the torque of the starter/generator motor 120 to the motor control unit 220 in order to control stopping of the engine, thereby controlling recovery of the rotational energy of the engine. In addition, the hybrid control unit 240 may control the lower-level control units so as to determine the mode-switching condition and perform mode switching at the time of performing driving-mode-switching control.

Of course, it will be apparent to those skilled in the art that the connection relationships between the control units and the functions/division of the control units described above are merely illustrative, and are not limited by the names thereof. For example, the hybrid control unit 240 may be implemented such that the function thereof is provided by any one of the control units other than the hybrid control unit 240 or such that the function thereof is distributed and provided by two or more of the other control units.

The terms "unit" and "control unit" forming part of the names of the motor control unit (MCU) and the hybrid control unit (HCU) are merely terms that are widely used in the naming of a controller for controlling a specific function of a vehicle, and should not be construed as meaning a generic function unit. For example, in order to control the function peculiar thereto, each control unit may include a communication device, which communicates with other control units or sensors, a memory, which stores therein an operating system, logic commands, and input/output information, and one or more processors, which perform determinations, calculations, and decisions necessary for control of the function peculiar thereto.

The above-described configuration in FIGS. 2 and 3 is merely an exemplary configuration of a hybrid electric vehicle. It will be apparent to those skilled in the art that the hybrid electric vehicle to which embodiments of the present invention are applicable is not limited to having the above-described configuration.

Hereinafter, steering-based emergency braking function control according to embodiments of the present invention will be described based on the above-described configuration of the hybrid electric vehicle.

An embodiment of the present invention proposes technology for controlling, when an obstacle is present ahead of a host vehicle, activation of an emergency braking function or an activation condition according to a turning path based on the distance to the forward obstacle and the steering angle.

The configuration of a control device for implementing the above embodiment will be described below with reference to FIG. 4.

Figure 4:
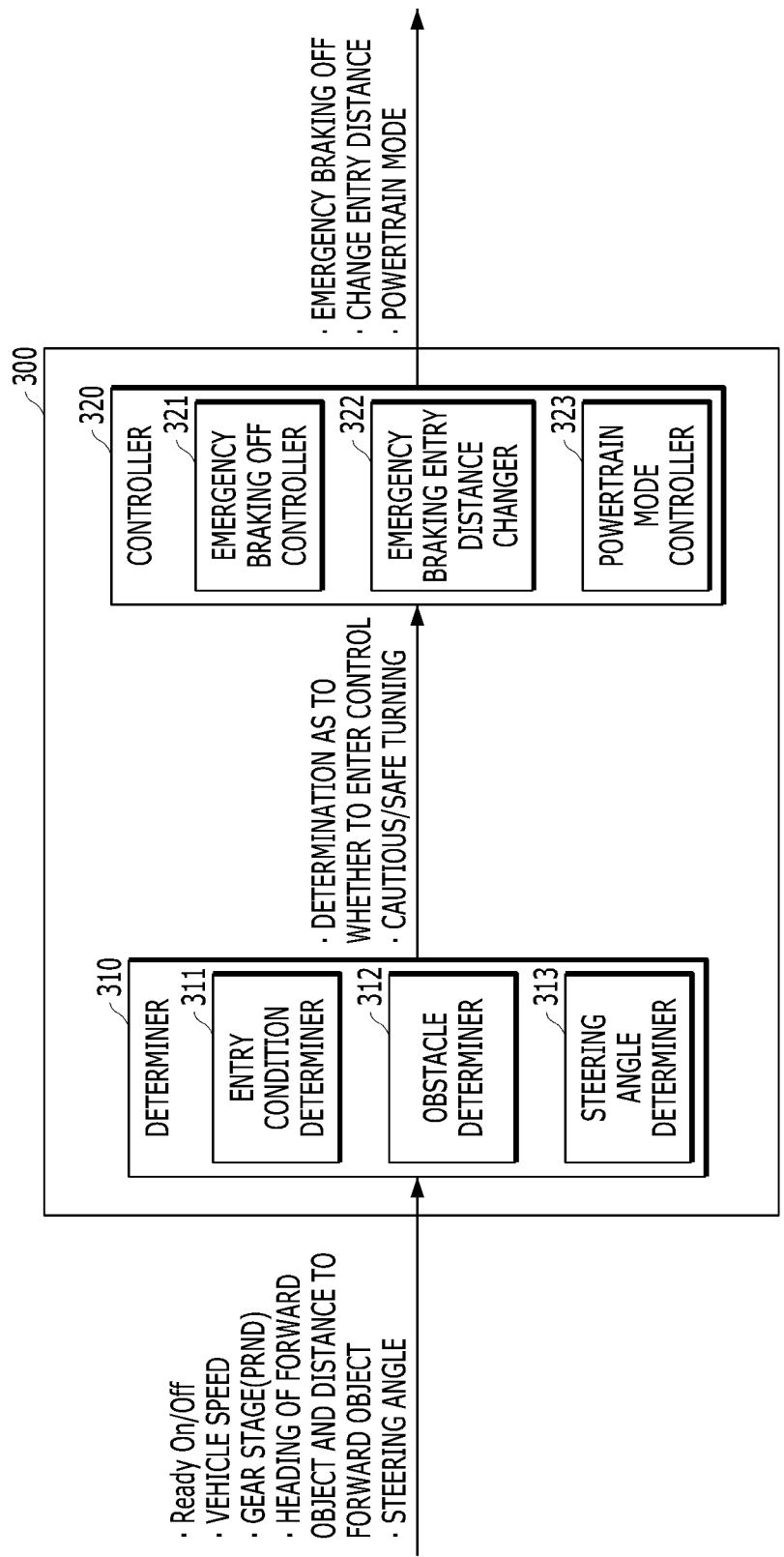
FIG. 4 is a diagram showing an example of the configuration of an emergency braking entry control device according to an embodiment of the present invention.

FIG. 4 is a diagram showing an example of the configuration of an emergency braking entry control device according to an embodiment of the present invention.

Referring to FIG. 4, an emergency braking entry control device 300 according to an embodiment may include a determiner 310 and a controller 320.

The determiner 310 may include an entry condition determiner 311, an obstacle determiner 312, and a steering angle determiner 313. The controller 320 may include an emergency braking OFF controller 321, an emergency braking entry distance changer 322, and a powertrain mode controller 323.

Hereinafter, the operation of the components of the emergency braking entry control device 300 will be described in more detail.

The determiner 310 may receive information on whether the hybrid electric vehicle is ready for travel (i.e. HEV Ready, which corresponds to "IG on" of a general vehicle), information on the vehicle speed, information on the currently selected gear stage (P, R, N, D, etc.), information on the heading of an object located on the travel path of the vehicle (i.e. ahead of the vehicle) and the distance to the object, and information on the steering angle according to manipulation of the steering wheel. The information on the currently selected gear stage may be acquired from the transmission control unit 250. The information on the heading of the obstacle and the distance thereto may be acquired through an obstacle detection device, for example, a sensor capable of detecting a distance, such as a vision sensor, a radar sensor, a LiDAR sensor, or an ultrasonic sensor, or through a control unit controlling the obstacle detection device, e.g. an advanced driver assistance system (ADAS) control unit. The information on the vehicle speed may be transmitted from a wheel speed sensor. The information on the steering angle may be acquired from the steering control unit. However, the embodiments are not limited thereto.

The entry condition determiner 311 may determine emergency braking control entry according to the embodiment when the driver manipulates the accelerator pedal in the situation in which the current state of the vehicle is "HEV Ready", in which a gear stage (i.e. the D-range or the R-range) is locked so that the vehicle travels in one direction, and in which the distance to an object present on the travel path of the vehicle is less than a predetermined distance $D_{thr}$.

The entry condition determiner 311 determines whether to enter a mode of controlling the emergency braking function depending on whether control entry conditions are satisfied.

The control entry conditions are as follows:
1) HEV Ready (EV Ready or IG On is also possible depending on the powertrain)
2) D-range
3) Detection of obstacle ahead In summary, the control entry conditions can be determined to be satisfied when the vehicle detects an obstacle ahead in the state of being capable of traveling in a forward direction using the power of the power source.

The obstacle determiner 312 determines whether to enter a mode of controlling the emergency braking function based on the position of the obstacle with respect to the travel direction of the vehicle according to the steering angle. For example, in the situation shown in FIG. 1, the host vehicle 10 is steered to the right, and the forward object 20 is present only in the area to the left and front of the host vehicle 10 with respect to the travel direction (i.e. the obliquely right-upward direction in the drawing) determined by steering manipulation, and no object is present in either the area directly ahead of or the area to the right and front of the host vehicle 10. In the case in which the host vehicle is steered to the right, the obstacle determiner 312 may determine control entry when no obstacle is present in either the area directly ahead of or the area to the right of the host vehicle with respect to the travel direction determined by steering manipulation. On the other hand, in the case in which the host vehicle is steered to the left, the obstacle determiner 312 may determine control entry when no obstacle is present in either the area directly ahead of or the area to the left of the host vehicle with respect to the travel direction determined by steering manipulation.

This means that the obstacle determiner 312 determines control entry when no obstacles other than the forward object 20 are present on the travel path corresponding to the input steering angle.

The steering angle determiner 313 may determine whether to enter a mode of controlling the emergency braking function and the type of control based on the steering angle and the distance to the forward obstacle.

The steering angle determiner 313 may determine control entry when the steering angle is larger than a collision steering angle. The steering angle determiner 313 may determine the type of control to be "cautious turning" under the condition of "safe steering angle>steering angle>collision steering angle", and may determine the type of control to be "safe turning" under the condition of "steering angle>safe steering angle".

Here, the collision steering angle is the maximum steering angle at which the host vehicle and the forward obstacle collide with each other, and the safe steering angle is a steering angle at which the host vehicle and the forward obstacle travel while maintaining the minimum safe distance (e.g. a in FIG. 6, which will be described later) or more therebetween.

The collision steering angle and the safe steering angle may be calculated using the Ackerman geometry model, which is widely used for modeling of turning of a vehicle according to steering manipulation.

Figure 5:
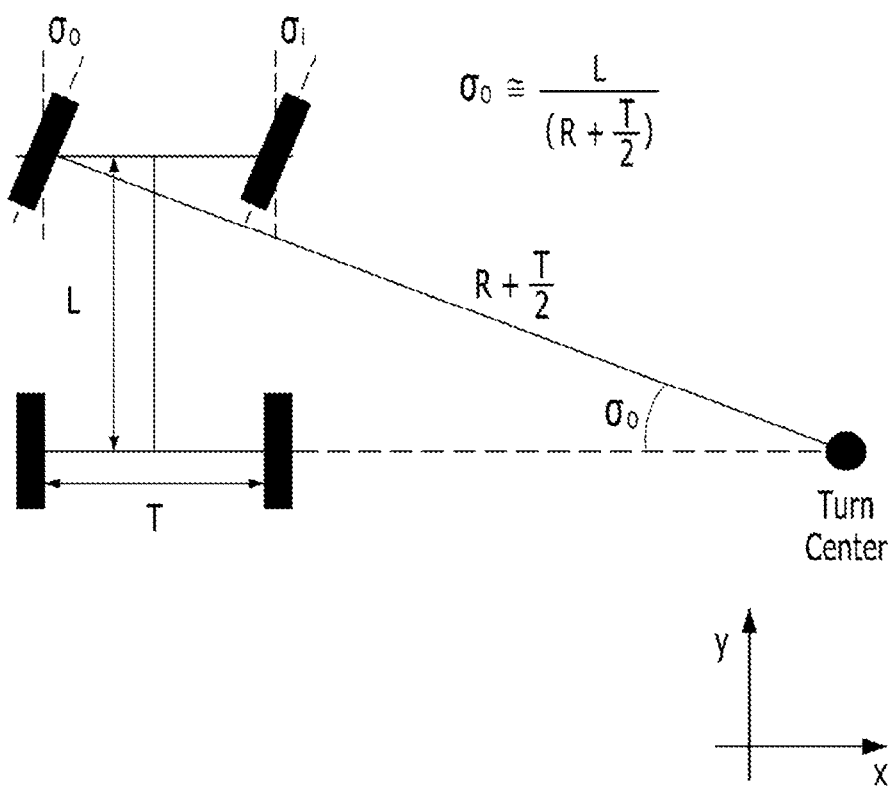
FIG. 5 is a diagram showing an example of a geometric model applied when a vehicle turns at a low speed.

FIG. 5 is a diagram showing an example of a geometric model applied when a vehicle turns at a low speed.

Referring to FIG. 5, a predicted travel path of the vehicle according to the steering angle input by the driver may be obtained through the Ackerman geometry model.

In the Ackerman geometry model, when the predicted travel path of the vehicle is a circular turning path, the radius R of circular turning may be determined based on the steering angle $\sigma_o$ of the outer wheel for turning, as shown in Equation 1 below.

$$\sigma_o \cong \frac{L}{\left(R + \frac{T}{2}\right)} \quad \text{Equation 1}$$

In Equation 1 above, R represents the radius of circular turning, T represents the tread (or track) of the vehicle, and L represents the wheelbase of the vehicle. Here, R is the distance from the center of circular turning to the center of the tread, and thus the substantial turning radius used for determination of the possibility of a collision with an obstacle present outside the turning direction during turning is the distance from the center of circular turning to the outer wheel, which is equivalent to the sum of T/2 and R. The predicted turning path according to the steering angle may be obtained through calculation of the radius using Equation 1 above.

Figure 6:
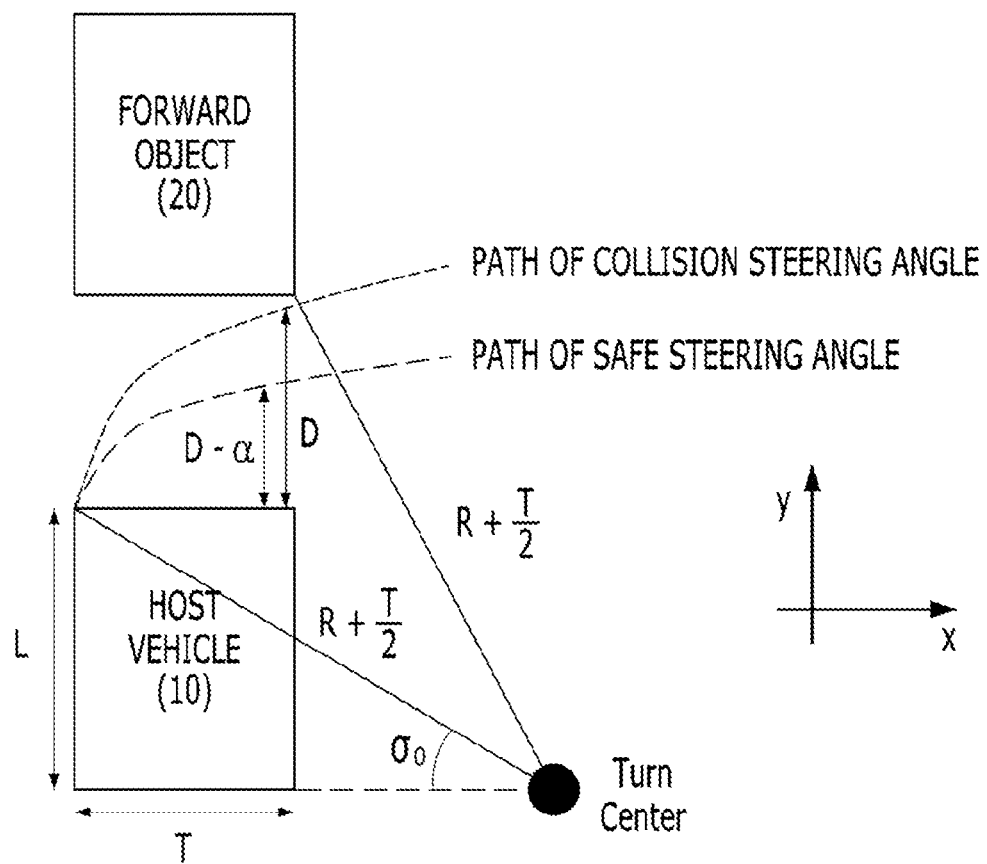
FIG. 6 is a diagram for explaining a collision steering angle and a safe steering angle according to an embodiment of the present invention.

FIG. 6 is a diagram for explaining the collision steering angle and the safe steering angle according to an embodiment of the present invention.

Referring to FIG. 6, the steering angle at which the host vehicle 10 moves a distance D, which is the distance to the forward obstacle 20, in the y-axis direction while moving a distance equivalent to the tread T thereof in the x-axis direction may be obtained as the collision steering angle.

In addition, the steering angle at which the host vehicle 10 moves a distance equivalent to the value D-α in the y-axis direction while moving a distance equivalent to the tread T thereof in the x-axis direction may be obtained as the safe steering angle. Here, α is the minimum safe distance between the forward obstacle 20 and the body of the host vehicle 10 during turning (or the outer wheel of the host vehicle 10 during turning). This minimum safe distance may be set through experimentation, and may be generally set to 1 m. However, the embodiments are not limited thereto.

Referring again to FIG. 4, all of the entry condition determiner 311, the obstacle determiner 312, and the steering angle determiner 313 may determine control entry (On), and when the steering angle determiner 313 determines the type of control (cautious turning or safe turning), the determiner 310 may transmit determination as to whether to enter the control mode (On/Off) and determination of the type of control to the controller 320.

When control entry is determined to be On and the type of control is determined to be safe turning, the emergency braking OFF controller 321 of the controller 320 may turn off the emergency braking function.

When control entry is determined to be On and the type of control is determined to be cautious turning, the emergency braking entry distance changer 322 may change the distance to the forward obstacle at which the emergency braking function is activated to be shorter than a default distance. Accordingly, activation of the emergency braking function may be prevented unless the host vehicle approaches the forward obstacle to the extent that the host vehicle collides with the forward obstacle.

When control entry is determined to be On, the powertrain mode controller 323 may select the powertrain mode depending on the type of control. For example, when the type of control is safe turning, the powertrain mode controller 323 may change the powertrain mode to the HEV series mode, in which the engine clutch 130 is opened and charging is performed on the HSG 120, in order to enhance launch performance after lane change. Also, when the type of control is cautious turning, the powertrain mode controller 323 may change the powertrain mode to the EV mode, in which only the drive motor 140 is used, in order to ensure stable lane change. Of course, this mode change is merely illustrative, and the embodiments are not limited thereto.

Hereinafter, a process of controlling activation of the emergency braking function described above will be described with reference to FIG. 7.

Figure 7:
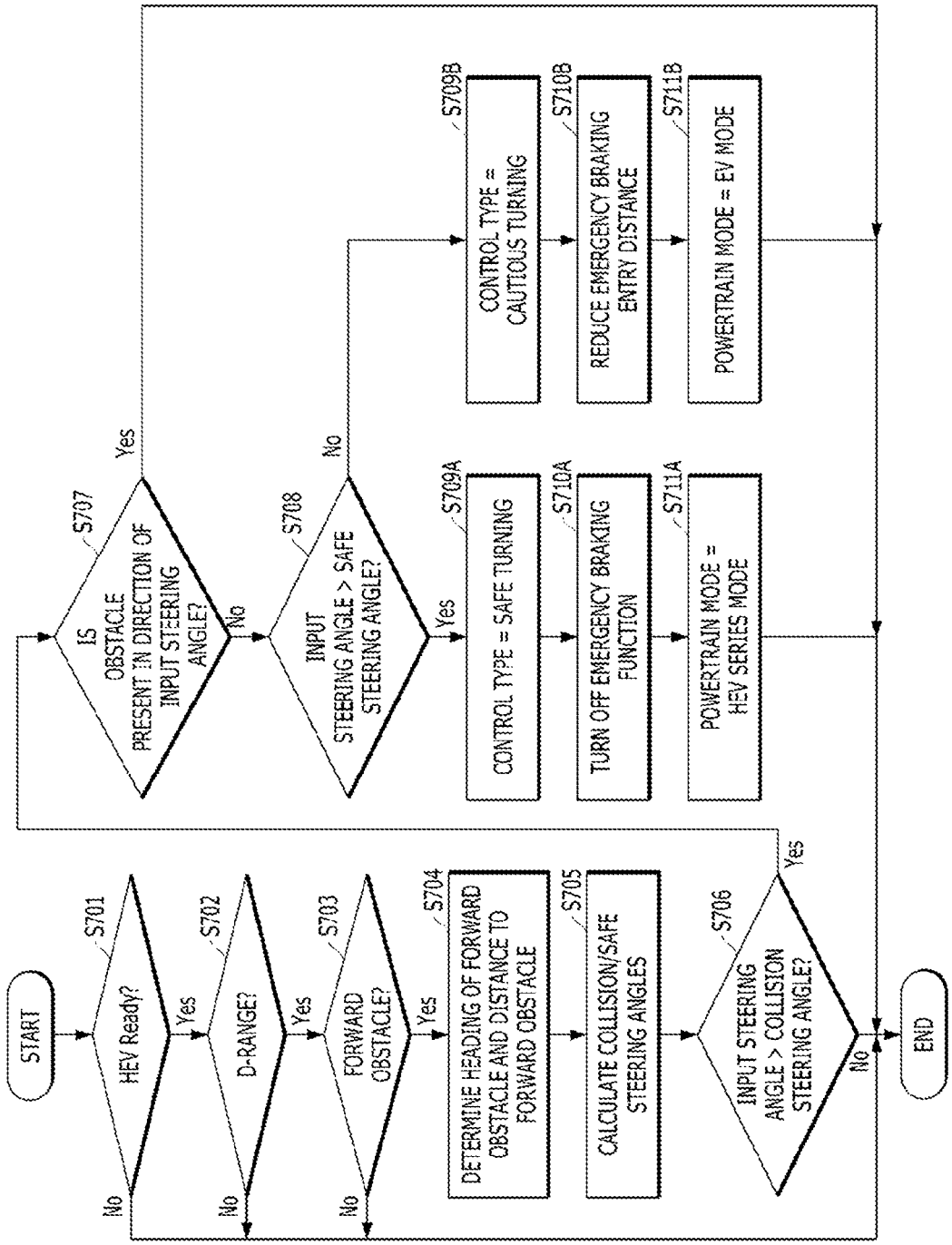
FIG. 7 is a flowchart showing an example of an emergency braking entry control process according to an embodiment of the present invention.

FIG. 7 is a flowchart showing an example of an emergency braking entry control process according to an embodiment of the present invention.

Referring to FIG. 7, when the current state of the vehicle is "HEV Ready" (Yes in S701), when the current gear stage is D (Yes in S702), and when an obstacle is present ahead (Yes in S703), the determiner 310 may determine the heading of the obstacle and the distance to the obstacle (S704). In addition, the determiner 310 may determine a collision steering angle and a safe steering angle based on the steering angle (i.e. the steering angle input according to manipulation of the steering wheel by the driver) and the distance to the obstacle (S705). Determination of the collision steering angle and the safe steering angle is performed in the same manner as that described above with reference to FIGS. 5 and 6, thus a duplicate description thereof will be omitted.

When the input steering angle is not larger than the collision steering angle (No in S706), a collision with the obstacle present ahead is expected. Thus, the determiner 310 does not perform control of the emergency braking function. On the other hand, when the input steering angle is larger than the collision steering angle (Yes in S706), the determiner 310 determines whether an obstacle is located in the direction of the input steering angle (S707).

When an obstacle is located in the direction of the input steering angle (Yes in S707), the determiner 310 does not perform control of the emergency braking function.

On the other hand, when no obstacle is located in the direction of the input steering angle (No in S707), the determiner 310 determines the control entry to be On, and compares the input steering angle and the safe steering angle with each other (S708) to determine the type of control.

When the input steering angle is larger than the safe steering angle (Yes in S708), the determiner 310 may determine the type of control to be safe turning (S709A). Accordingly, the controller 320 may turn off the emergency braking function (S710A), and may set the powertrain mode to the HEV series mode (S711A).

On the other hand, when the input steering angle is not larger than the safe steering angle (i.e. when the input steering angle is equal to or smaller than the safe steering angle) (No in S708), the determiner 310 may determine the type of control to be cautious turning (S709B). Accordingly, the controller 320 may reduce the reference distance at which the emergency braking function is activated (S710B), and may set the powertrain mode to the EV mode (S711B).

Despite having been described above with reference to a hybrid electric vehicle, the emergency braking entry control device and process according to the embodiments can also apply to vehicles having powertrains different from that of the hybrid electric vehicle through appropriate modification.

For example, in the case of a vehicle equipped with a single type of power source, such as a general internal combustion engine or a general motor, the powertrain mode controller 323 may be omitted from the configuration shown in FIG. 4. Accordingly, steps S711A and S711B may also be omitted from the process shown in FIG. 7.

The present invention may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), Read-Only Memory (ROM), Random Access Memory (RAM), Compact Disk ROM (CD-ROM), a magnetic tape, a floppy disc, and an optical data storage.

As is apparent from the above description, a vehicle associated with at least one embodiment of the present invention, configured as described above, is capable of effectively preventing an emergency braking function from being unnecessarily activated in consideration of the distance to an obstacle present ahead and a driver's steering manipulation.

In addition, when embodiments of the present invention are applied to environment-friendly vehicles, it is also possible to effectively control a powertrain mode in consideration of the distance to an obstacle present ahead and a driver's steering manipulation.

However, the effects achievable through embodiments of the present invention are not limited to the above-mentioned effects, and other effects not mentioned herein will be clearly understood by those skilled in the art from the above description.

It will be apparent to those skilled in the art that various changes in form and details may be made without departing from the spirit and essential characteristics of the invention set forth herein. Accordingly, the above detailed description is not intended to be construed to limit the invention in all aspects and is to be considered by way of example. The scope of the invention should be determined by reasonable interpretation of the appended claims and all equivalent modifications made without departing from the invention should be included in the following claims.

What is claimed is:

1. An emergency braking function control method of a vehicle, the method comprising:
   detecting an obstacle ahead of the vehicle in a first lane, the vehicle being in a state of being travelable in a forward direction using power of a power source, wherein the obstacle is in a stopped state;
   in response to the detecting, determining a first steering angle and a second steering angle, the first steering angle being a maximum steering angle at which the vehicle collides with the obstacle and the second steering angle being a steering angle at which the vehicle turns while maintaining a minimum safe distance from the obstacle, the first and second steering angles being determined based on a distance to the obstacle, a heading of the obstacle, and an input steering angle; and
   determining whether to change an emergency braking function based on the input steering angle, the first steering angle, or the second steering angle, wherein changing the emergency braking function comprises turning off the emergency braking function even though the distance to the obstacle is within a default distance at which the emergency braking function operates in response to the input steering angle being larger than the second steering angle when the vehicle turning from the first lane to a second lane due to the obstacle.

2. The method according to claim 1, wherein it is determined to change the emergency braking function in response to the input steering angle being larger than the first steering angle.

3. The method according to claim 2, wherein changing the emergency braking function comprises changing an activation reference distance at which the emergency braking function is activated to be shorter than the default distance in response to the input steering angle being equal to or smaller than the second steering angle.

4. The method according to claim 3, wherein the power source comprises a hybrid powertrain comprising an engine and a motor, the method further comprising setting a powertrain mode to an EV mode.

5. The method according to claim 2, wherein changing the emergency braking function is performed based on no obstacles other than the obstacle being present on a travel path corresponding to the input steering angle.

6. The method according to claim 1, wherein the power source comprises a hybrid powertrain comprising an engine and a motor, the method further comprising setting a powertrain mode to an HEV series mode.

7. The method according to claim 1, wherein the state of being travelable in the forward direction using the power of the power source comprises a state in which a D-range is input in a state of HEV Ready, EV Ready, or IG On.

8. The method according to claim 1, wherein the first steering angle and the second steering angle are determined based on a tread and a wheelbase.

9. The method according to claim 1, wherein it is determined not to change the emergency braking function in response to the first steering angle being larger than the input steering angle.

10. A non-transitory computer-readable recording medium storing a program configured to execute the emergency braking function control method according to claim 1.

11. A vehicle comprising:
an obstacle detection device;
a power source; and
an emergency braking function control device configured to:
   in response to detection of an obstacle in a stopped state ahead of the vehicle in a first lane, the vehicle being in a state of being travelable in a forward direction using power of the power source, determine a first steering angle, the first steering angle being a maximum steering angle at which the vehicle collides with the obstacle, and a second steering angle, the second steering angle being a steering angle at which the vehicle turns while maintaining a minimum safe distance from the obstacle, based on a distance to the obstacle, a heading of the obstacle, and an input steering angle; and
   to change an emergency braking function based on the input steering angle, the first steering angle, or the second steering angle, wherein the emergency braking function control device is changed by turning off the emergency braking function even though the distance to the obstacle is within a default distance at which the emergency braking function operates in response to the input steering angle being larger than the second steering angle when turning from the first lane to a second lane due to the obstacle.

12. The vehicle according to claim 11, wherein the emergency braking function control device is configured to change the emergency braking function in response to the input steering angle being larger than the first steering angle.

13. The vehicle according to claim 12, wherein the emergency braking function control device is configured to change an activation reference distance at which the emergency braking function is activated to be shorter than the default distance in response to the input steering angle being equal to or smaller than the second steering angle.

14. The vehicle according to claim 13, wherein the power source comprises a hybrid powertrain comprising an engine and a motor, and wherein the emergency braking function control device is configured to set a powertrain mode to an EV mode.

15. The vehicle according to claim 12, wherein the emergency braking function control device is configured to change the emergency braking function in response to no obstacles other than the obstacle being present on a travel path corresponding to the input steering angle.

16. The vehicle according to claim 11, wherein the power source comprises a hybrid powertrain comprising an engine and a motor, and wherein the emergency braking function control device is configured to set a powertrain mode to an HEV series mode.

17. The vehicle according to claim 11, wherein the state of being travelable in a forward direction using the power of the power source comprises a state in which a D-range is input in a state of HEV Ready, EV Ready, or IG On.

18. The vehicle according to claim 11, wherein the emergency braking function control device is configured to determine the first steering angle and the second steering angle based on a tread and a wheelbase.

19. An emergency braking function control method of a vehicle, the method comprising:
   detecting an obstacle ahead of the vehicle in a first lane, the vehicle being in a state of being travelable in a forward direction using power of a power source, wherein the obstacle is in a stopped state, wherein the power source comprises a hybrid powertrain comprising an engine and a motor;
   in response to the detecting, determining a first steering angle and a second steering angle, the first steering angle being a maximum steering angle at which the vehicle collides with the obstacle and the second steering angle being a steering angle at which the vehicle turns while maintaining a minimum safe distance from the obstacle, the first and second steering angles being determined based on a distance to the obstacle, a heading of the obstacle, an input steering angle, a tread, and a wheelbase; and
   determining whether to change an emergency braking function based on the input steering angle, the first steering angle, or the second steering angle, wherein changing the emergency braking function comprises turning off the emergency braking function even though the distance to the obstacle is within a default distance at which the emergency braking function operates in response to the input steering angle being larger than the second steering angle when the vehicle turning from the first lane to a second lane due to the obstacle.

* * * * *